United States Patent [19]
Bornhorst, Jr. et al.

[11] Patent Number: 5,424,846
[45] Date of Patent: Jun. 13, 1995

[54] CYLINDER SUPPORT APPARATUS AND METHOD FOR USE IN AN ENGRAVER

[75] Inventors: Kenneth F. Bornhorst, Jr., Centerville; Robert D. Likins, Wilmington; Thomas J. Eichhorn, Dayton; David R. Seitz, Vandalia; Curtis Woods, Centerville, all of Ohio

[73] Assignee: Ohio Electronic Engravers, Inc., Dayton, Ohio

[21] Appl. No.: 57,327

[22] Filed: May 5, 1993

[51] Int. Cl.⁶ .................. H04N 1/23; B23B 15/00; B23C 9/00; B23D 7/08
[52] U.S. Cl. ..................... 358/299; 408/67; 409/132; 409/219
[58] Field of Search ........... 358/299; 408/33, 67; 409/64, 76, 87, 94, 131, 132, 133, 145, 152, 219, 227

[56] References Cited

U.S. PATENT DOCUMENTS

| | | | |
|---|---|---|---|
| 1,815,105 | 7/1931 | Howey. | |
| 2,493,628 | 1/1950 | Harley | 88/14 |
| 2,769,199 | 11/1956 | Boyajean | 18/1 |
| 2,874,479 | 2/1959 | Farber | 33/185 |
| 2,881,246 | 4/1959 | Fairchild | 178/6.6 |
| 3,544,713 | 12/1970 | Case et al. | 178/7.1 |
| 3,582,549 | 6/1971 | Hell et al. | 178/69.5 |
| 3,694,570 | 9/1972 | Kotov et al. | 178/6.6 |
| 3,770,888 | 11/1973 | de Vos et al. | 358/299 |
| 3,838,258 | 9/1974 | Logan | 235/151.11 |
| 3,949,159 | 4/1976 | Richards et al. | 178/6.6 |
| 3,964,382 | 6/1976 | Baar et al. | 101/1 |
| 3,990,133 | 11/1976 | Schalles et al. | 408/33 X |
| 4,003,311 | 1/1977 | Bardin | 101/426 |
| 4,013,829 | 3/1977 | Baar et al. | 358/299 |
| 4,054,081 | 10/1977 | Brown | 82/1 C |
| 4,054,745 | 10/1977 | Norman | 178/4.1 |
| 4,057,838 | 11/1977 | Doelves et al. | 358/299 |
| 4,357,633 | 11/1982 | Buechler | 358/299 |
| 4,450,486 | 5/1984 | Buechler | 358/299 |
| 4,451,856 | 5/1984 | Buechler | 358/299 |
| 4,612,584 | 9/1986 | George et al. | 358/299 |
| 5,029,011 | 7/1991 | Fraser | 358/299 |

OTHER PUBLICATIONS

"Datwyler", Max Daetwyler Corporation, 13420 West Reese Blvd., Huntersville, N.C., 28078, undated brochure.

"Twin-Pilot", Maschinenfabrik Kaspar Walter GmbH & Co. KG, Plinganserstrasse 22, 8000 Munchen 70, Germany, undated brochure.

"Motion adapted to human needs," Magnetic Antriebstechnik.

"Linear Actuator P Series...," Infomagnetic Antriebstechnik.

"MAGPUSH Linear Actuators. Push-pull solutions that stand out.", Magnetic Antriebstechnik.

(List continued on next page.)

Primary Examiner—Benjamin R. Fuller
Assistant Examiner—Eric Frahm
Attorney, Agent, or Firm—Biebel & French

[57] ABSTRACT

A method and apparatus for automated loading and unloading of a cylinder in an engraver. The method and apparatus permit the engraver to accommodate cylinders of differing geometries, including a range of lengths, diameters and mounting configurations. The engraver includes a headstock and a tailstock which cooperate to rotatably support a cylinder at an engraving station in the engraver. The engraver includes a cylinder handling system having at least one cylinder supporting the cylinder between the headstock and the tailstock during the loading and unloading of the cylinder. The cylinder handling system includes a driver for driving the cylinder support towards and away from the engraving station until the headstock and the tailstock engage and rotatably support the cylinder. Once the cylinder is rotatably supported between the headstock and the tailstock, then the cylinder support is retracted. The cylinder support includes a telescoping support member having a support nest for engaging and supporting the cylinder at the engraving station.

49 Claims, 6 Drawing Sheets

OTHER PUBLICATIONS

"Telescope Actuators TELEMAG GTL . . . ," Infomagnetic Antriebstechnik.

"Telescope Actuators TELEMAG LC 12 Z . . . ," Infomagnetic Antriebstechnik.

"Telescope Actuators TELEMAG HC 8 A . . . ," Infomagnetic Antriebstechnik.

"The TELEMAG Pillar. Gives your ideas the right lift.", Magnetic Antriebstechnik.

"Telemag-the obvious choice for flexibility and economy at work.", Magnetic Elektromotoren.

"Telemag 2-Section, LC12ZWAK," and Telemag 3-Section, LC 12ZWDK.

"Magnetic Linear Actuators. Right for every application.", Magnetic Antriebstechnik.

"Think Boomerang System" Rotogravure Cylinder Making System (Undated).

"Martin Galvanotechnik Galvanoplastie Plating" Martin AG (Undated).

The Gravure Ass'n of Amer., *The Gravure Engraving Manual* (1987).

Balcom, *Basic Rotogravure* (1988).

Heimann GmbH, *Drucktechnische Beratung-Graphischer Handel* (Pamphlet, Hamm, Germany 1984).

Heimann GmbH, *Check-Master* (Pamphlet, Date Unknown).

Ahauser Tiefdruck-Gravuren GmbH & Co., *Engraving Tester ET2000* (Pamphlet, Date Unknown).

Promatec Graphique, *M2B2 modele depose Micro Surface Sarl* (Pamphlet, Antony, France, 1987).

*VIP-Video-Image-Processing* (Pamphlet, Author Unknown, Date Unknown).

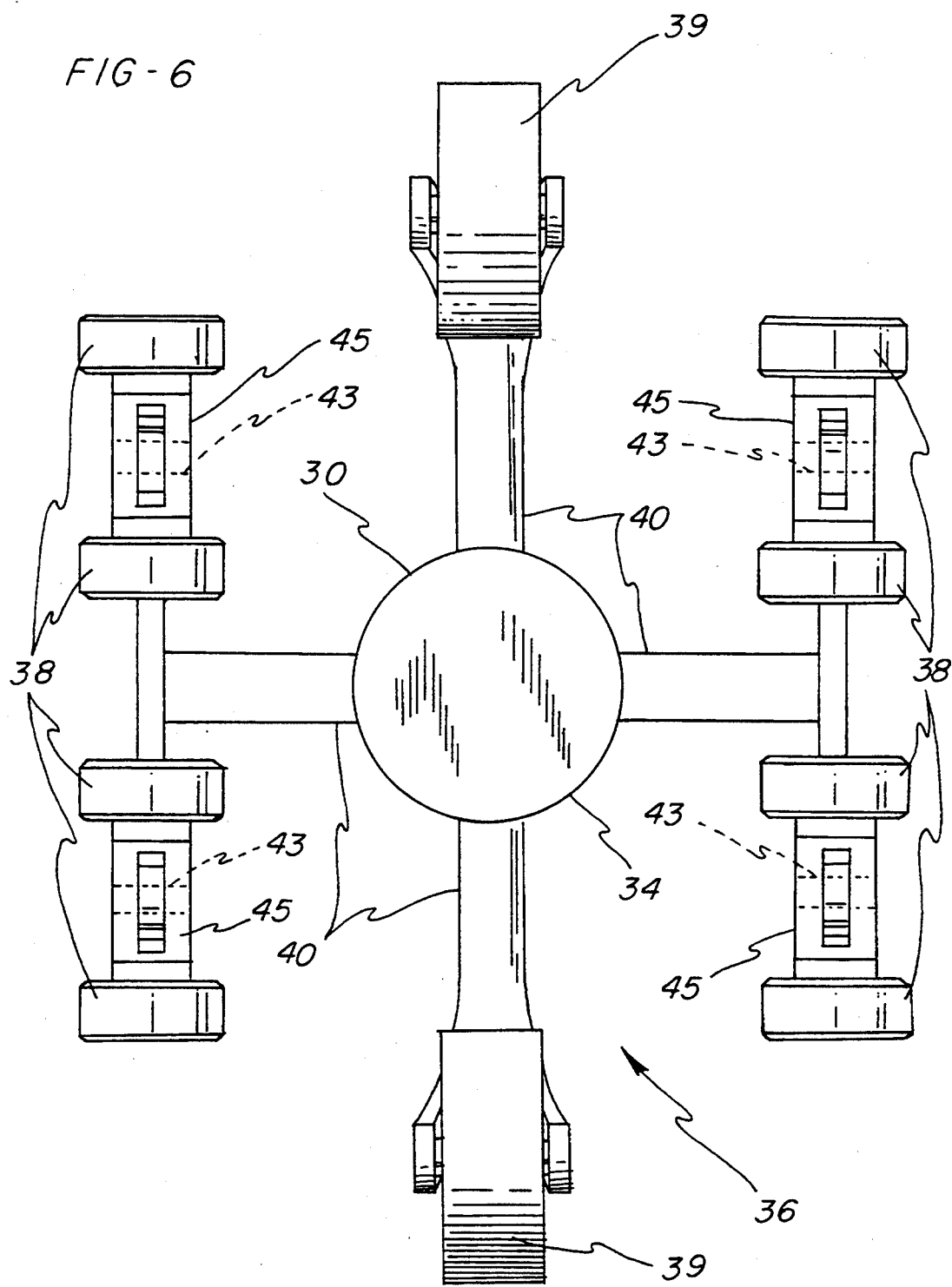

CYLINDER SUPPORT APPARATUS AND METHOD FOR USE IN AN ENGRAVER

BACKGROUND OF THE INVENTION

1. Field of the Invention

This invention relates to an engraver, and more particularly, it relates to a cylinder support and method for supporting a cylinder to be engraved in an engraver of the general type disclosed, for example, in U.S. Pat. Nos. 2,881,246; 2,874,479; 3,964,382; and 4,013,829.

2. Description of Related Art

The basic principle of electro-mechanical engraving of a gravure cylinder involves rotating a plated cylinder while actuating an electrically driven tool which cuts or engraves cells or lines into the surface of the plated cylinder. The engraved cylinder is normally used in a web-type gravure printing press for printing paper, plastic or metallic film material. In addition to printing newspapers and magazines, the engraved cylinders may also be used for direct or indirect printing of cloth, applying glue, printing of packaging materials for products, and printing of woodgrain patterns for making a wall panelling, floor coverings and other surface coverings.

In the gravure printing process, the engraved cylinder is flooded with ink, and a doctor blade wipes off excess ink from the surface so that only the engraved cells contain ink which is transferred to the material being printed. To obtain a high quality print, it is necessary that the cells be very accurately placed or located on the cylinder surface, usually within 1 or 2 microns within a desired predetermined location. The depth of the engraved cells must also be accurately controlled since the depth determines the amount of ink transferred which, in turn, determines the shade of gray in a black/white print, for example. In a color print, the amount of ink transferred to the paper or materials is even more critical since multiple colors are typically mixed to produce various shades of all possible colors. A slight variation in the desired amount of ink affects not only the darkness of the color but, more importantly, the production of the desired color hues.

In engraving systems of the past, the cylinders were manually guided or hoisted to an engraving area of the engraver, whereupon it was secured between a stationary headstock and a slidable tailstock. The tailstock forcibly engaged one end of the cylinder and forced the other end of the cylinder into engagement with the headstock. For shafted cylinders, the ends of the cylinders would be gripped by chucks or other clamping devices located in the headstock and tailstock.

Another problem with engravers of the past is that the cylinders had to be manually loaded into the engraver. Because of the weight and size of the cylinders, it was very time-consuming to properly position and manually align the cylinders in the engraver. In addition, it was often necessary that the operator manually adjust the tailstock before the engraver could accommodate cylinders of varying lengths. Still another problem is that in the engravers of the past, the operator had to manually adjust the engraving head to accommodate i cylinders of different diameters.

What is needed, therefore, is a method and apparatus for facilitating loading a cylinder in an engraver and for handling the cylinder so that it can be properly centered and aligned between the headstock and tailstock of the engraver.

SUMMARY OF THE INVENTION

In one aspect, this invention comprises a cylinder handling system for use in an engraver having a headstock and a tailstock which cooperate to rotatably support a cylinder at an engraving station in said engraver, comprising at least one support for supporting the cylinder between said headstock and tailstock; and a driver coupled to the at least one support for driving said at least one support towards and away from said engraving station.

In another aspect, the invention comprises a cylinder support for use in an engraver having headstock and tailstock which cooperate to rotatably support a cylinder at an engraving station in said engraver, comprising support means for supporting the cylinder between said headstock and tailstock; and drive means coupled to said support means for driving said support means towards and away from said engraving station.

In another aspect, the invention comprises the method for supporting a cylinder in an engraver comprising the steps of: (a) positioning the cylinder on a support at an engraving station in the engraver; (b) rotatably supporting said cylinder between a headstock and a tailstock; and (c) retracting said support away from said engraving station.

In another aspect, the invention comprises the method for supporting a cylinder in an engraver comprising the steps of: (a) positioning the cylinder on a support at an engraving station in the engraver; (b) rotatably supporting said cylinder between a headstock and a tailstock; (c) retracting said support away from said engraving station; and (d) driving the engraver which permits the head to be driven into operative relationship with the cylinder surface.

An object of this invention is to provide a method for automatically loading a cylinder in an engraver, thereby either reducing or eliminating the need for precision handling by an operator.

Another object of this invention is to provide a cylinder handling system which facilitates the centering of a cylinder between a headstock and a tailstock of an engraver.

Still another object is to provide an engraver which can accept a variety of setup parameters, including cylinder length, diameter, test cut position and engrave head characteristics from a controller, thereby reducing or eliminating the need for manual adjustment by an operator.

Another object of this invention is to provide a cylinder handling system having an automatically controlled headstock, tailstock and head slide which provide for programmable adjustment in order to accommodate cylinders of varying lengths and diameters.

These objects, and others, may be more readily understood in connection with the following specification, claims, and Drawing.

BRIEF DESCRIPTION OF THE DRAWING

FIG. 6 is a top view of one of the cylinder supports, showing details of the support nest.

DETAILED DESCRIPTION OF THE PREFERRED EMBODIMENT

Figure 1:
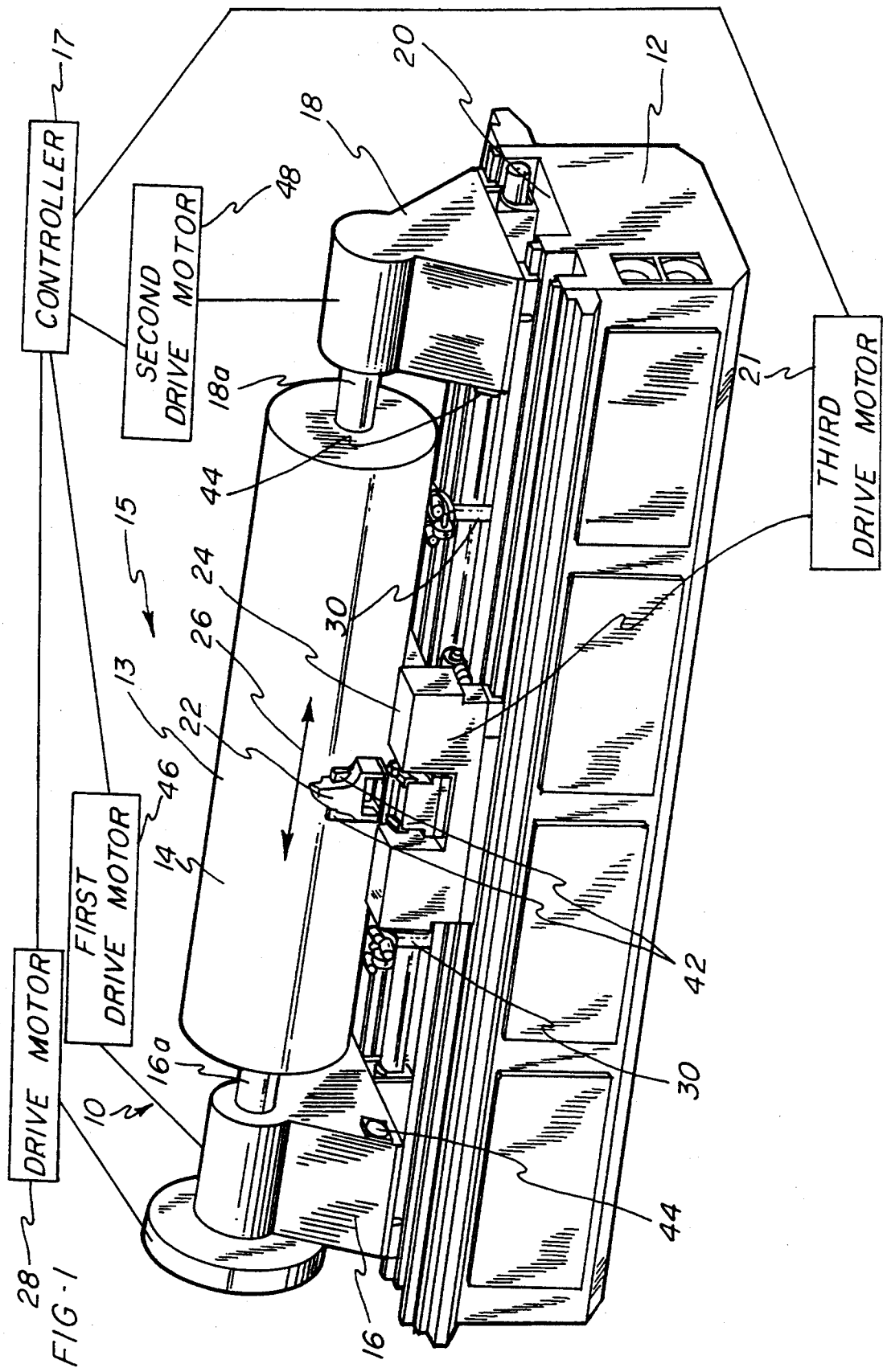
FIG. 1 is perspective view of a programmable gravure engraver showing a headstock, a tailstock, an engraving head, and a plurality of cylinder supports.
Figure 2:
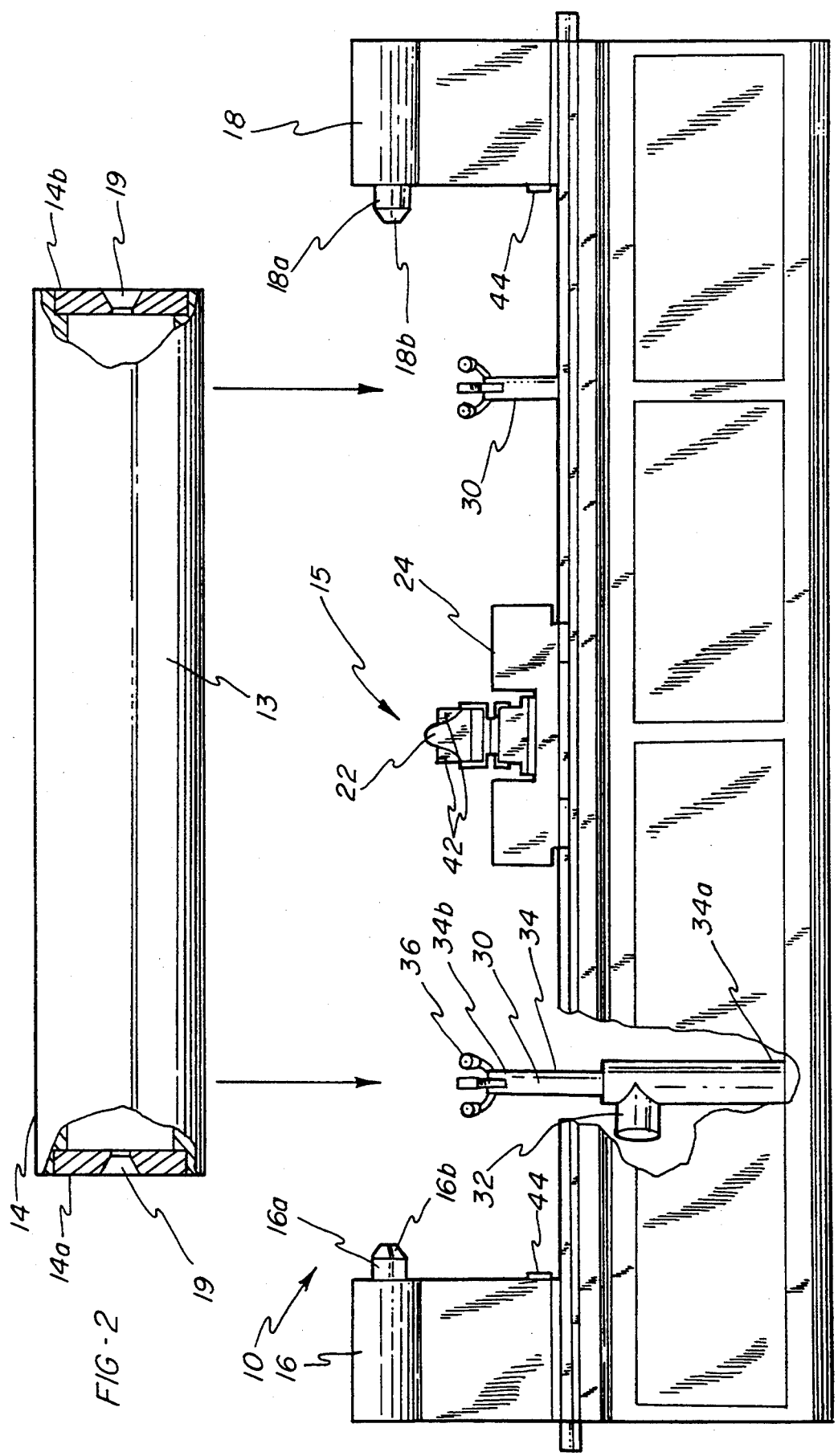
FIG. 2 is a fragmentary front plan view of the engraver shown in FIG. 1, showing details of one of the telescoping cylinder supports.
Figure 3:
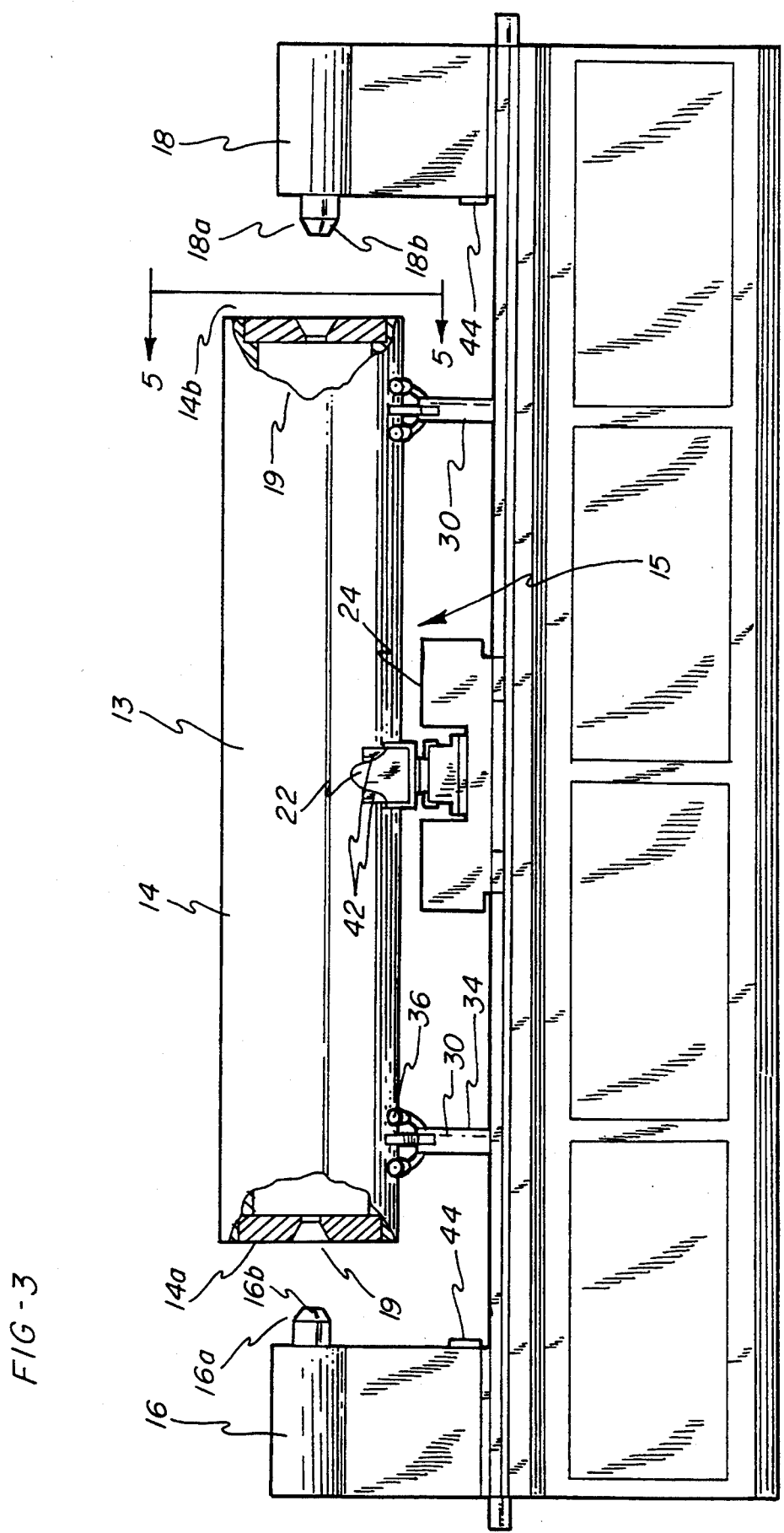
FIG. 3 is another plan view of the engraver showing the cylinder supported by the cylinder supports.
Figure 4:
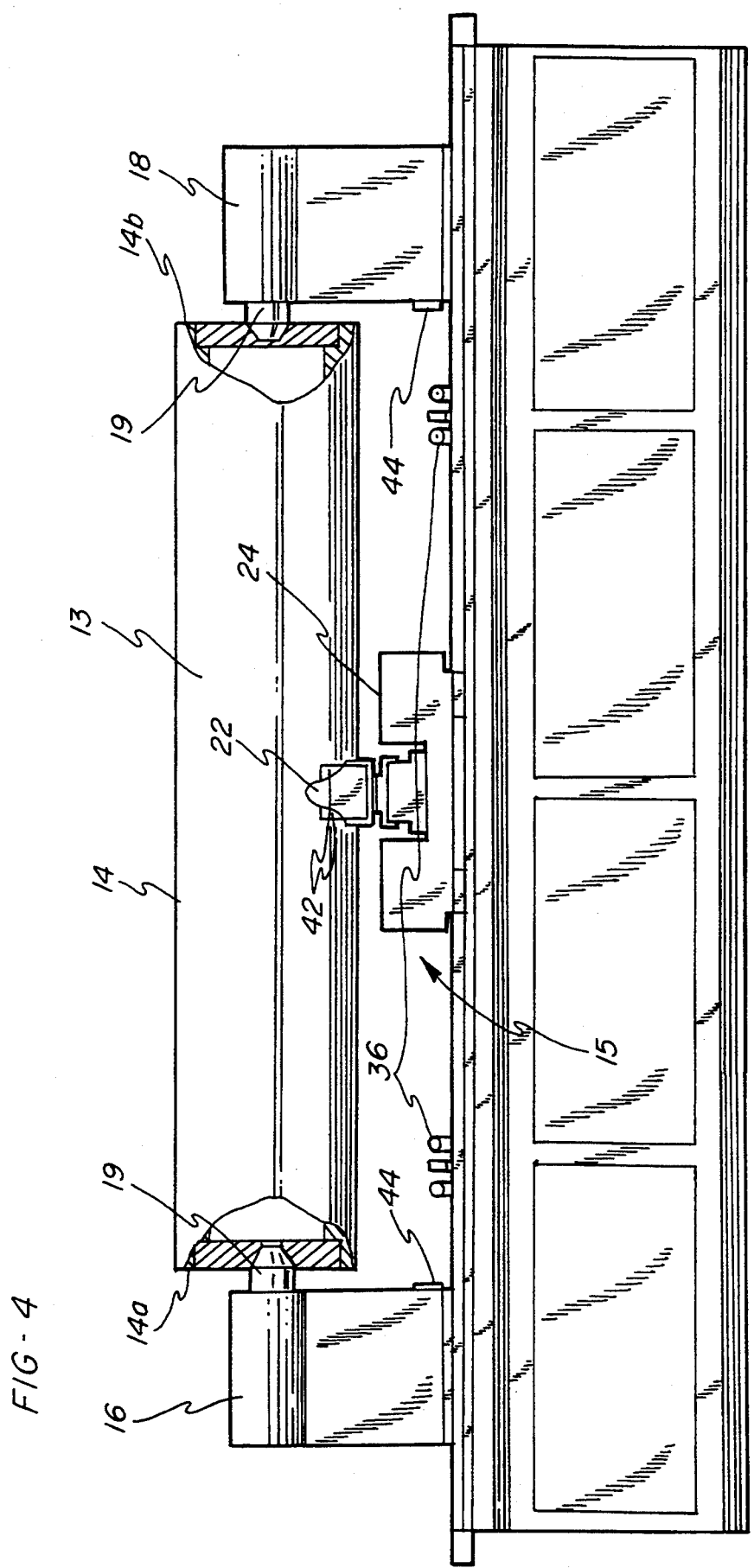
FIG. 4 is another plan view of the engraver showing the cylinder rotatably supported by the headstock and tailstock after the cylinder supports have been retracted.

FIG. 1 is a general perspective view of a preferred embodiment of an engraver, designated generally as engraver 10. In the embodiment being described, the engraver 10 is a gravure engraver, but the invention may be suitable for use in any engraver. The engraver 10 may have a surrounding slidable safety cabinet structure which is not shown for ease of illustration. Engraver 10 comprises a base 12 having a headstock 16 and tailstock 18 slidably mounted in tract 20 such that the headstock 16 and tailstock 18 can move towards and away from each other. In this regard, engraver 10 comprises a plurality of linear actuators or first drive motor means or first drive motor 46 and a second drive motor means or second drive motor 48 which are capable of driving the headstock 16 and tailstock 18, respectively, towards and away from each other. For example, the drive motors may cause the headstock 16 and tailstock 18 to be actuated to a fully retracted position, as shown in FIG. 2, or to a cylinder support position shown in FIG. 1. The drive motors may be selectively energized to cause the headstock 154 and tailstock 18 to be actuated either independently or simultaneously. Although not shown, a single drive motor may be used with a single lead screw (not shown) having reverse threads (not shown) on which either end causes the headstock 16 and tailstock 18 to move simultaneously towards and away from each other as the leadscrew is driven. Driving both the headstock 16 and tailstock 18 permits cylinders 14 of varying lengths to be loaded by an overhead crane, for example, whose path is perpendicular to the engravers axis of rotation. However, it should be appreciated that a stationary headstock 16 and tailstock 18 may be used with a driven tailstock 16 or headstock 18, respectively, if, for example, a cylinder loading mechanism (not shown) loads the cylinder 14 by moving it in a direction which is generally parallel to the axis of rotation of the engraver. As best illustrated in FIGS. 2-4, the headstock 16 and tailstock 18 comprise a support shaft 16a and support shaft 18a, respectively. The support shafts 16a and 18a each comprise a conically shaped end 16b and 18b, respectively. The cylinder 14 comprises a first end 14a and second end 14b each having a receiving opening 19 (FIG. 2) for receiving ends 16b and 18b, respectively. As best illustrated in FIGS. 2-4, the receiving opening 19 is also conically shaped in cross-section so as to matingly receive the ends 16b and 18b.

Although not shown, if a shafted cylinder (not shown) was to be engraved, then the headstock 16 and tailstock 18 would each include a gripping device or chuck (not shown) to rotatably support the cylinder at the engraving station 15.

The engraver 10 also comprises an engraving head 22 having a cutting tool or stylus (not shown) for engraving a surface 13 on the cylinder 14. In the embodiment being described, surface 13 preferably has a copper coating of the type used in gravure engraving. The engraving head 22 is slidably mounted on a carriage 24 such that a third drive means or third drive motor 21 can drive the engraving head 22 towards and away from the cylinder 14 in a direction which is generally radial with respect to the center axis of cylinder 14. The carriage 24 is also slidably mounted on base 12 such that it traverses the entire surface 13 of cylinder 14 in the direction of double arrow 26 in FIG. 1, which is generally parallel to the axis of the cylinder 14. The engraver 10 also comprises a lead screw (not shown) and drive motors (not shown) for causing the carriage 24 to move in the direction of double arrow 26. The engraving head 22, carriage 24 and transverse movement thereof is similar to that shown in Ser. Nos. 08/038,679; 08/022,127; and 08/023,060 which is assigned to the same assignee as the present invention and which is incorporated herein by reference.

The engraver comprises a controller 17 which controls the operation of the engraver 10 and which also controls all the drive motors, such as drive motors 21, 46 and 48. The drive motors 21, 46 and 48 mentioned herein are controlled by a programmable controller 17 which controls the operation of the engraver 10.

The engraver 10 also comprises drive means or a drive motor 28 for rotatably driving the support member 16a, cylinder 14, and support member 18a. The drive motor 28 is operatively coupled to the programmable controller 17.

The engraver 10 further comprises support means or at least one cylinder support 30 for supporting the cylinder 14 between the headstock 16 and tailstock 18, for example, during loading and unloading. The cylinder support 30 comprises a support member 34 having a first end 34a conventionally secured to base 12, for example, by a weld. A second end 34b of support member 34 comprises a support nest 36 which receives and supports cylinder 14. In the embodiment being described, the support member 30 is a telescoping support, with the second end 34b being capable of telescoping towards and away from said first end 34a. In this regard, each cylinder support 30 also comprises drive means or a driver 32 which is coupled to controller 17 and which comprises a gear and screw assembly (not shown) for telescoping or driving the support nest 36 towards and away from the engraving station 15. As best illustrated in FIG. 2, the controller 17 can energize driver 32 to move the cylinder support 30 into the support position shown in FIG. 2, whereupon the support nest 36 is capable of supporting the cylinder 14 at engraving station 15, for example, when the cylinder 14 is being loaded for engraving. As described later herein, the controller 17 subsequently energizes driver 32 to retract the cylinder support 30 and support nest 36 to the retracted position shown in FIG. 4, for example, after the support shafts 16a and 18a of headstock 16 and tailstock 18, respectively, have engaged and support the cylinder 14.

Figure 5:
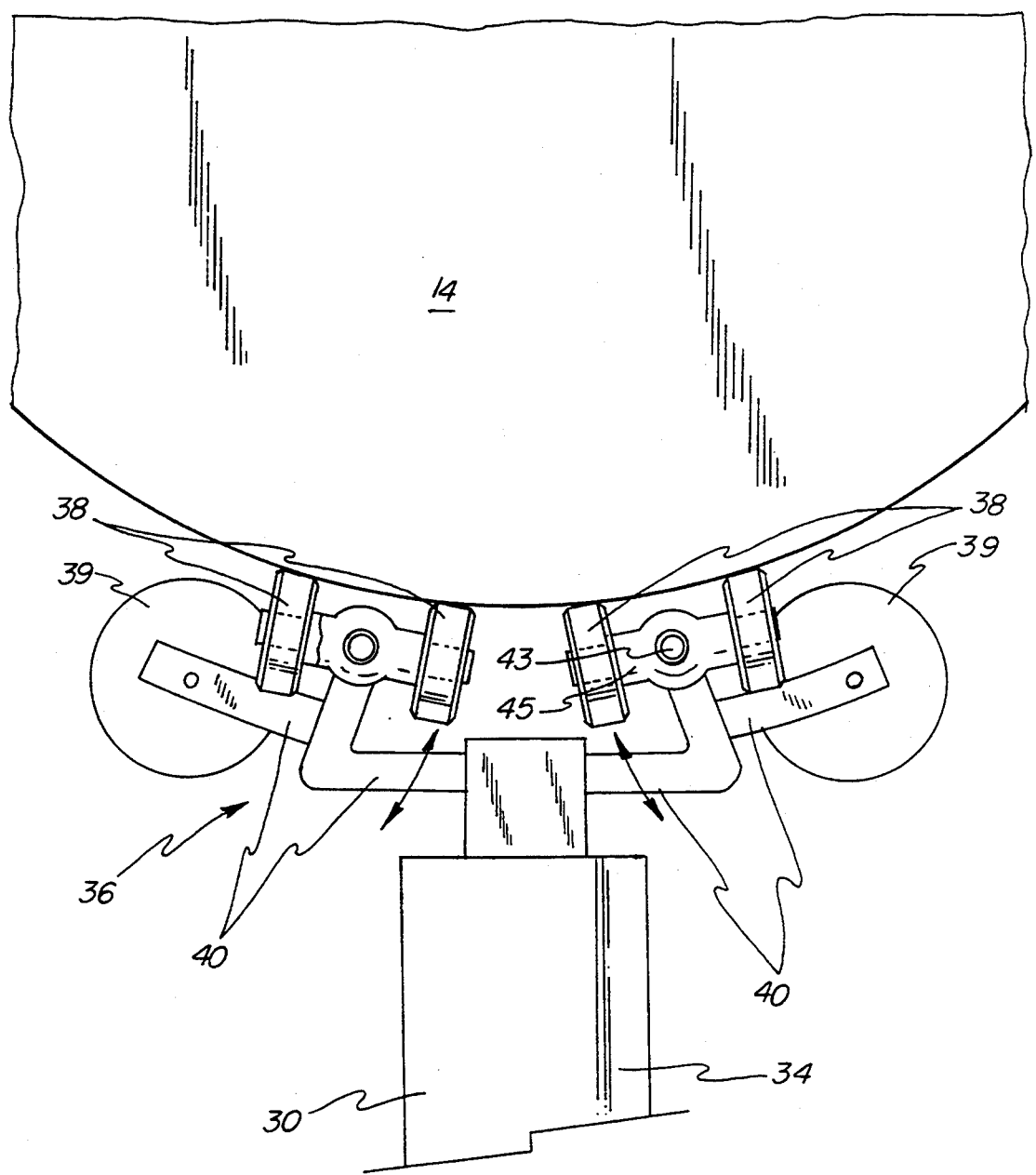
FIG. 5 is a fragmentary sectional view showing details of the cylinder support and a support nest.

As best shown in FIGS. 5 and 6, the support nest 36 comprises a plurality of support arms 40 which rotatably support a plurality of rollers 38 and 39. The plurality of rollers 38 are mounted in pairs on a roller assembly 45. Each roller assembly 45 is pivotally mounted on an axle 43 (FIG. 5) which is coupled to one of the support arms 40. As best illustrated in FIG. 5, each roller assembly 45 can pivot about the axis of its respective axle 43. The roller assemblies 45 are each self-aligning and pivot to permit the engraver to accommodate a range of cylinder diameters.

The axis of each roller 38 is generally perpendicular to the axis of cylinder 14. This facilitates permitting the cylinder 14 to move laterally in the engraver 10 when the headstock 16 and tailstock 18 grip and release the cylinder 14. The plurality of rollers 38 also facilitate supporting cylinder 14 such that its center axis is generally parallel with the center axis of each of the support shafts 16a and 18a of the headstock 16 and tailstock 18, respectively.

It is to be noted that rollers 39 facilitate guiding and centering cylinder 14 between the headstock 16 and tailstock 18, thereby accommodating lateral misalignment when the cylinder 14 is loaded onto the engraver 10 from above. In the embodiment being described, the plurality of rollers 38 and 39 are made of composite material. It is to be noted that the support nest 36 is capable of supporting cylinders 14 of various weights and having various lengths and diameters.

Although not shown, the engraver 10 may include a plurality of brushes (not shown) positioned in operative relationship with the rollers 38 and 39. The function of the brushes is to clean the rollers and keep their surfaces free of foreign material, such as copper shavings. This facilitates preventing the engraver 10 from making unwanted indentations or scratches in the surface 13 of cylinder 14.

The engraver 10 also comprises sensing means or first sensors 42 which are coupled to controller 17 and which are located on the engraving head 22 (FIG. 1). The sensing means or sensors 42 are capable of sensing, for example, the surface 13 of cylinder 14. The sensors 42 are also capable of sensing the ends 14a and 14b of cylinder 14.

The engraver 10 also comprises second sensing means or sensors 44 coupled to controller 17 and associated with the headstock 16 and tailstock 18 for detecting the proximate location of the carriage 24 relative to the headstock 16 and tailstock 18. In the embodiment being described the first and second sensors 42 and 44 facilitate preventing the carriage 24 from engaging either the headstock 16 or the tailstock 18. A method for loading and unloading the cylinder 14 on the engraver 10 will now be described.

When it is desired to load a cylinder 14 on engraver 10, controller 17 energizes the first and second driver motors 46 and 48 to cause the headstock 16 and tailstock 18, respectively, to move to the loading position shown in FIG. 2. It is to be noted that controller 17 can be programmed with dimensions of the cylinder 14, such as length and diameter. The controller 17 also energizes drive 32 of cylinder support 30 to telescope the support member 34 such that the support nest 36 is operatively positioned at the engraving station 15, as shown in FIG. 2. It is to be noted that controller 17, having been programmed with the length and diameter of cylinder 14, energizes driver 32 to position the support nest 36 such that, when cylinder 14 is supported by the cylinder supports 30, the ends 16b and 18b are generally positioned in operative relationship or alignment with receiving openings 19 on the first end 14a and second end 14b, respectively. After the headstock 16 and tailstock 18 have been actuated to the open position shown in FIG. 2 and the cylinder supports 30 are in the support position, the cylinder 14 is lowered onto the support nest 36. As mentioned earlier herein, the plurality of rollers 39 assist locating and centering the cylinder 14 on the roller assemblies 45 and their respective rollers 38.

Once the cylinder 14 is supported by the support nests 36 of cylinder supports 30, the controller 17 can energize the first and second drivers 46 and 48 to drive the support members 16a and 18a towards ends 14a and 14b, respectively. The headstock 16 and tailstock 18 are driven towards cylinder ends 14a and 14b, respectively, until ends 16b and 18b matingly engage the mating receiving openings 19 in the ends 14a and 14b. Once cylinder 14 is supported between ends 16b and 18b of headstock 16 and tailstock 18, respectively, controller 17 energizes the driver 32 to retract the support nest 36 to the non-support position shown in FIG. 4. It is to be noted that the cylinder 14 is rotatably supported between the headstock 16 and tailstock 18 such that, when controller 17 energizes drive motor 28, the cylinder 14 rotates, for example, in a clockwise direction. The controller 17 subsequently energizes the third drive motor 19 to move the carriage 24 and engraving head 22, respectively, into operative relationship with the surface 13 of the cylinder 14. It is to be noted that the controller 17 may use sensors 42 and 44 to detect the relative position of the cylinder 14 with respect to the engraving head 22. The sensors 42 and 44 are also capable of sensing the ends 14a and 14b in order to facilitate preventing carriage 24 from engaging either the headstock 16 or tailstock 18. The sensors 42 and 44 also permit the controller 17 to position the engraving head 22 in the approximate center of cylinder 14 which, in turn, enables the engraver 10 to accommodate for longitudinal variations in cylinder 14 lengths after the cylinder 14 has been rotatably mounted in the engraver 10. This permits the image (not shown) to be engraved in the surface 13 to be centered on the cylinder 14. The sensors 42 and 44 also enable the engraver 10 to set travel limits to prevent the engraving head 22 from engaging either the headstock 16 or tailstock 18.

After the cylinder 14 is properly located at the engraving station 15, the cylinder ends 14a and 14b are detected by sensors 42 and 44. A test pattern (not shown) is engraved at a position typically defined by the controller 17 or a supervisory computer (not shown). The test pattern is a small pattern of full and partial cells (not shown) characteristic of the cells to be engraved on the cylinder surface 13, The test pattern is typical cut at a location on the surface 13 which will not be used by the image being engraved.

If the test pattern cut is unsatisfactory then correction are made and another test pattern is cut. This process is repeated until a successful test pattern is cut. If the test pattern is acceptable, in the embodiment being described, controller 17 energizes drive motor 28 to rotatably drive cylinder 14. Controller 17 then causes the carriage 24 to cause the engraving head 22 to traverse the surface 13 of cylinder 14 and simultaneously energizes the cutting stylus (not shown) to oscillate into contact with the cylinder 14, thereby engraving the desired image which comprises a series of control depth cells (not shown) in the surface 13 of cylinder 14. The cylinder 14 rotates in synchronism with the oscillating movement of the stylus (not shown) while the lead screw (not shown) arrangement provides axial movement of the engraving head 22 and carriage 24 such that a precisely controlled engraving path (not shown) is maintained on the surface 13 of print cylinder 14.

After engraving has been completed, controller 17 energizes third drive motor 21 to retract the engraving head 22. Controller 17 also energizes driver 32 to cause the cylinder support 30 to move into the support position shown in FIGS. 1 and 2. Controller 17 then energizes the first and second drive motors 46 and 48 to retract the headstock 16 and tailstock 18, respectively, as shown in FIG. 3. The cylinder 14 may then be removed from the engraving station 15, and another cylinder may then be loaded and engraved in the manner described above.

Advantageously, this invention provides a method and apparatus for automatically loading an engraver 10 with a cylinder 14 to be engraved. The method and apparatus reduce or eliminate the need for an operator during loading and unloading of cylinder 14. The invention may be used to fully automate the engraving process or, alternatively, the invention could be semi-automated, thereby permitting the operator to manually control the operation of the engraver 10. The method and apparatus also provide means for automatically loading and centering cylinder 14 at engraving station 15 such that, for example, when the engraving head 22 is in the home position shown in FIG. 1, the engraving head 22 is positioned generally midway between ends 14a and 14b of cylinder 14.

Various changes or modification in the invention described may occur to those skilled in the art without departing from the true spirit or scope of the invention. For example, although the invention has been shown and described as being pertinent to the gravure engraving environment, it should be appreciated that it could be used in other type of engraving, such as laser engraving of flexo rollers or other processes such as polishing of cylinders 14. Also, the engraver 10 could be provided with one cylinder support 30 or a plurality of cylinder supports 30, if desired. Furthermore, the driver 32 and first, second and third drive motor means 21, 46, and 48 have been described as comprising motors, but they could be any suitable driving apparatus which is capable of performing the same function. Likewise, the cylinder support or support means 30 has been shown and described as comprising the support member 34 and support nest 36, but it could comprise any suitable means which is capable of supporting the cylinder 14 at the engraving station 15 during loading and unloading. The above description of the invention is intended to be illustrative only and not limiting, and it is not intended that the invention be restricted thereto, but that it be limited only by the true spirit and scope of the appended claims.

What is claimed:

1. An engraver comprising are engraver cylinder support having a headstock and a tailstock which cooperate to rotatably support a gravure cylinder at an engraving station in said graver, comprising:
    at least one additional support for supporting the gravure cylinder between said headstock and said tailstock; and
    a driver coupled to said at least one support for adjustably driving said at least one support towards and away from said engraving station.

2. The engraver cylinder support of claim 1 wherein engraver cylinder support system further comprises:
    a first drive motor coupled to said headstock;
    a second drive motor coupled to said tailstock;
    said first and second drive motors being selectively energized by a controller, in order to cause said headstock and said tailstock to move towards and away from said cylinder.

3. The engraver cylinder support of claim 1 wherein said engraver cylinder support comprises:
    a drive motor coupled to both said headstock and said tailstock;
    said drive motor being coupled to said headstock and said tailstock such that said headstock and said tailstock is moveable towards and away from each other when said drive motor is energized.

4. The engraver cylinder support of claim 1 wherein said engraver cylinder support comprises:
    a drive motor coupled to either said headstock or said tailstock;
    said drive motor being coupled to either said headstock or said tailstock such that said headstock or said tailstock moves towards and away from said tailstock and said headstock, respectively, when said drive motor is energized.

5. The engraver cylinder support claim 1 wherein said cylinder comprises a first end and a second end, said headstock and said tailstock each comprise a support member for supporting said first end and said second end, respectively, of said cylinder.

6. The engraver support cylinder of claim 5 wherein said first end and said second end each comprise a receiving opening which is conically shaped in cross-section;
    said support member of said headstock and said tailstock being conically shaped so as to be received in mating engagement in said receiving opening in said first end and said second end, respectively.

7. The engraver cylinder support of claim 5 wherein said first end comprises a first shaft and said second end comprises a second shaft, said headstock and said tailstock each comprising a chuck for clamping either said first shaft or said second shaft.

8. A cylinder handling system for use in an engraver having a headstock and a tailstock which cooperate to rotatably support a cylinder at an engraving station in said engraver, comprising:
    at least one additional support for supporting the cylinder between said headstock and said tailstock; and
    a driver coupled to said at least one support for driving said at least one support towards and away from said engraving station;
    said engraver being a gravure engraver.

9. The cylinder handling system of claim 1 wherein said engraver comprises a carriage having an engraving head slidably mounted thereon; said cylinder handling system further comprising:
    at least one sensor associated with said carriage for sensing a position of said cylinder when said cylinder is located at said engraving station.

10. The cylinder handling system of claim 9 wherein said cylinder comprises a first end and a second end, said at least one sensor comprises an inductive sensor for sensing a relative position between said cylinder and said engraving head as well as the first end and the second end of said cylinder.

11. The cylinder handling system of claim 1 wherein said at least one support further comprises a support nest.

12. The cylinder handling system of claim 11 wherein said support nest comprises a plurality of rollers for supporting said cylinder between said headstock and said tailstock.

13. The cylinder handling system of claim 11 wherein said driver comprises a motor and said support nest comprises a plurality of rollers for supporting said cylinder between said headstock and said tailstock.

14. An engraver comprising an engraver cylinder support having a headstock and a tailstock which cooperate to rotatably support a gravure cylinder at an engraving station in said engraver, comprising:
additional support means for supporting the gravure cylinder between said headstock and tailstock; and
drive means coupled to said support means for driving said support means towards and away from said engraving station.

15. The engraver cylinder support of claim 14 wherein said engraver cylinder support comprises:
first drive motor means coupled to said headstock;
second drive motor means coupled to said tailstock;
said first drive motor means and said second drive motor means being selectively energized by a controller to move said headstock and said tailstock towards and away from said cylinder.

16. The engraver cylinder support of claim 14 wherein said engraver cylinder support comprises:
a drive motor coupled to both said headstock and said tailstock;
said drive motor being coupled to said headstock and said tailstock such that said headstock and tailstock move towards and away from each other when said drive motor is energized.

17. The engraver cylinder support of claim 14 wherein said engraver cylinder support comprises:
a drive motor coupled to either said headstock or said tailstock;
said drive motor being coupled to either said headstock or said tailstock such that said headstock or said tailstock moves towards and away from said tailstock and said headstock, respectively, when said drive motor is energized.

18. The engraver cylinder support of claim 14 wherein said cylinder comprises a first end and a second end, said first end and said second end each comprising a receiving opening which is conically shaped in cross-section;
each of said headstock and said tailstock having a conically shaped support member for being received in mating engagement in each said receiving opening in said first end and said second end, respectively.

19. The engraver cylinder support of claim 14 wherein said cylinder comprises a first end and a second end, said first end and said second end each comprising a support shaft;
each of said headstock and said tailstock having a gripping device for receiving said support shafts and for rotatably supporting said cylinder.

20. The engraver cylinder support of claim 14 wherein said engraver is a gravure engraver.

21. The engraver cylinder support of claim 14 wherein said engraver comprises a carriage having an engraving head slidably mounted thereon; said cylinder support further comprising:
sensing means associated with said carriage for sensing the position of said cylinder when said cylinder is located at said engraving station.

22. The engraver cylinder support of claim 18 wherein said sensing means comprises an inductive sensor for sensing a relative position between said cylinder and said engraving head as well as a first end and a second end of said cylinder.

23. The engraver cylinder support of claim 15 wherein said engraver cylinder support comprises third drive motor means coupled to said engraving head for causing said engraving head to move towards and away from the engraving station.

24. The engraver cylinder support of claim 14 wherein said support means comprises a support member having a support nest.

25. The engraver cylinder support of claim 24 wherein said support nest comprises a plurality of support rollers rotatably mounted thereon.

26. The engraver cylinder support of claim 24 wherein said drive means comprises a motor, said support member comprising a telescoping member to enable said drive motor to telescope said support nest towards and away from said engraving station.

27. An engraver comprising:
a base;
a headstock and a tailstock, said headstock and said tailstock rotatably supporting a cylinder therebetween;
a carriage slidably mounted on said base to move in a direction which is parallel to said axis of said cylinder;
an engraving head slidably mounted on said carriage for movement towards and away from said engraving station;
a driver for rotatably driving said cylinder when said cylinder is mounted between said headstock and said tailstock;
at least one additional support for supporting the cylinder between said headstock and said tailstock; and
a support driver coupled to said at least one support for driving said at least one additional support towards and away from said engraving station and in a direction which is radial with respect to the cylinder axis when the cylinder is mounted between said headstock and said tailstock.

28. The engraver of claim 27 wherein said cylinder comprises a first end and a second end, said engraver further comprising:
a first drive motor coupled to said headstock;
a second drive motor driver coupled to said tailstock;
said first drive motor and said second drive motor being selectively energized to cause said headstock and said tailstock to move towards and away from each other such that said first drive motor and said second drive motor can mount said cylinder between said headstock and said tailstock.

29. The engraver of claim 27 wherein said engraver comprises:
a drive motor coupled to both said headstock and said tailstock;
said drive motor being coupled to said headstock and said tailstock such that said headstock and said tailstock move towards and away from each other when said drive motor is energized.

30. The engraver of claim 27 wherein said engraver comprises:
a drive motor coupled to either said headstock and said tailstock;
said drive motor being coupled to either said headstock or said tailstock such that said headstock or said tailstock moves towards and away from said tailstock and said headstock, respectively, when said drive motor is energized.

31. The engraver of claim 27 wherein said headstock and said tailstock each comprise a support member for engaging said first end and said second end, respectively, of said cylinder and also for rotatably supporting said cylinder at said engraving station.

32. The engraver of claim 31 wherein said first end and said second end of said cylinder each comprise a receiving opening which is arcuately shaped in cross-section;
  each of said support members of said headstock and tailstock being arcuately shaped so as to be received in mating engagement in said receiving opening of said first end and said second end, respectively.

33. The engraver of claim 27 wherein said first end comprises a first shaft and said second end comprises a second shaft;
  each of said headstock and said tailstock comprising a gripping device for gripping said first and second shafts and for rotatably supporting said cylinder.

34. The engraver of claim 27 wherein said engraver is a gravure engraver.

35. The engraver of claim 27 wherein said engraver comprises a carriage having an engraving head slidably mounted thereon; said engraver further comprising:
  sensing means associated with said carriage for sensing a position of said cylinder when said cylinder is located at said engraving station.

36. The engraver of claim 35 wherein said sensing means comprises an inductive sensor for sensing a relative position between said cylinder and said engraving head as well as a first end and a second end of said cylinder.

37. The engraver of claim 28 wherein said engraver comprises a third drive motor coupled to said engraving head for causing said engraving head to move towards and away from said engraving station.

38. The engraver of claim 27 wherein said at least one support comprises a support nest.

39. The engraver of claim 38 wherein said support nest comprises a plurality of rollers for supporting said cylinder between said headstock and tailstock.

40. The engraver of claim 39 wherein said plurality of rollers are positioned in a U-shape.

41. A method for supporting a cylinder in an engraver comprising the steps of:
  (a) positioning the cylinder on a support at an engraving station in the engraver;
  (b) rotatably supporting said cylinder between a headstock and a tailstock; and
  (c) retracting said support away from said engraving station so that the engraver can engrave the cylinder.

42. The method as recited in claim 41 wherein said cylinder comprises a first end and a second end, said step (b) further comprising the step of:
  (b) (1) driving said headstock and said tailstock towards said first end and said second end, respectively, in order to rotatably support said cylinder therebetween.

43. The method as recited in claim 42 wherein said step (a) further comprises the step of:
  (a) (1) energizing a first drive motor and a second drive motor to move said headstock and said tailstock, respectively, to a loading position.

44. The method as recited in claim 41 wherein said step (a) further comprises the step of:
  (a) (1) energizing a drive motor to cause said headstock and said tailstock to move simultaneously to a loading position.

45. The method as recited in claim 41 wherein said step (a) further comprises the step of:
  (a) (2) driving said support into said engraving station.

46. The method as recited in claim 41 wherein said support comprises an end having a support nest secured thereto.

47. The method as recited in claim 41 wherein said method further comprises the steps of:
  (d) engraving a surface of the cylinder with an image;
  (e) raising said support;
  (f) retracting said headstock and said tailstock such that said support supports the cylinder.

48. The method as recited in claim 47 wherein said cylinder comprises a first end and a second end, said method further comprises the steps of:
  (g) driving an engraving head to an operative relationship with the surface of the cylinder;
  (h) detecting said first end and said second end of the cylinder;
  (i) performing a test cut of a test pattern on the cylinder.

49. The method as recited in claim 41 wherein said step (a) comprises the step of driving said support towards said engraving station.

* * * * *

UNITED STATES PATENT AND TRADEMARK OFFICE
CERTIFICATE OF CORRECTION

PATENT NO. : 5,424,846
DATED : June 13, 1995
INVENTOR(S) : Bornhorst, Jr. et al.

It is certified that error appears in the above-identified patent and that said Letters Patent is hereby corrected as shown below:

Column 7, line 51, after "comprising", please delete "are", and insert --an-- therefor.

Column 7, line 62, before "engraver", please insert --said--.

Column 7, line 62, after "support", please delete "system".

Column 8, line 23, after "engraver", please delete "support".

Column 8, line 23, after "cylinder", please insert --support--.

Signed and Sealed this

Second Day of December, 1997

Attest:

BRUCE LEHMAN

*Attesting Officer*  *Commissioner of Patents and Trademarks*